United States Patent [19]

Creyf et al.

[11] Patent Number: 4,903,358
[45] Date of Patent: Feb. 27, 1990

[54] FIRE-RESISTANT SEATING, IN PARTICULAR AIRCRAFT SEATS

[75] Inventors: Hubert S. G. Creyf, Brugge; Eddie R. Du Prez, Brakel, both of Belgium

[73] Assignee: Recticel, Brussels, Belgium

[21] Appl. No.: 247,937

[22] Filed: Sep. 22, 1988

[30] Foreign Application Priority Data

Sep. 22, 1987 [NL] Netherlands ............... 8702253

[51] Int. Cl.⁴ .............. B64D 25/04; A47C 5/12
[52] U.S. Cl. ................... 5/459; 244/122 R; 428/76; 428/316.6; 428/317.9; 428/920
[58] Field of Search ............ 5/459, 481, 448; 297/DIG. 5; 244/122 R; 428/71, 76, 316.6, 317.9, 920

[56] References Cited

U.S. PATENT DOCUMENTS

| 4,092,752 | 6/1978 | Dougan | 5/459 |
| 4,439,472 | 3/1984 | Bell | 5/459 |
| 4,504,991 | 3/1985 | Klancnik | 5/459 |
| 4,690,859 | 9/1987 | Porter et al. | 5/459 |

FOREIGN PATENT DOCUMENTS

| 231968 | 8/1987 | European Pat. Off. | 5/459 |
| 3100994 | 8/1982 | Fed. Rep. of Germany | 297/DIG. 5 |
| 3512790 | 10/1986 | Fed. Rep. of Germany . | |
| 7429803 | 3/1976 | France . | |
| 8600242 | 1/1986 | Netherlands . | |
| 2045072A | 10/1980 | United Kingdom . | |
| 2096943 | 10/1982 | United Kingdom . | |

Primary Examiner—Alexander Grosz
Attorney, Agent, or Firm—Buchanan Ingersoll

[57] ABSTRACT

Fire-resistant seating, in particular aircraft seats, which consist of at least a soft, supporting material and a cover, between which there is a fire-resistant intermediate layer, which is a combustion of a layer of fiberglass fabric, which is firmly attached to the soft supporting material, and a layer of polyurethane foam, which has been rendered fire-resistant and is firmly attached both to the layer of fiberglass fabric and to the cover.

3 Claims, 1 Drawing Sheet

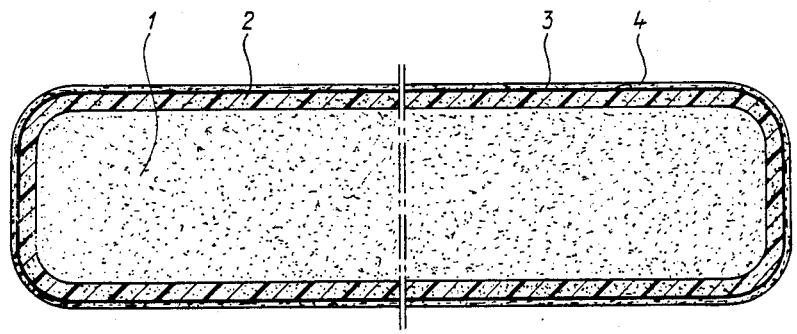

FIRE-RESISTANT SEATING, IN PARTICULAR AIRCRAFT SEATS

The invention relates to fire-resistant seating, in particular aircraft seats, which consist of at least a soft, supporting material and a cover, between which there is a fire-resistant intermediate layer, which is a combination of a layer of polyurethane foam which has been rendered fire-resistant (FIREND) and a fiberglass fabric.

Seating of this type is known from Dutch Patent Application No. 86.00242.

Although these aircraft seats meet the strict non-flammability requirements of the U.S. Department of Transportation; Federal Aviation Administration, published in the Federal Register, vol. 49, no. 209 (1984-10-26), they have the drawback not only (a) that, as a result of rubbing between the cover and the fiberglass fabric, on the one hand cover wear, and on the other hand, roughening of the fiberglass fabric arise, as a result of which glass fibres protrude through the cover, with the associated unpleasant consequences for the user, but also (b) that there is a danger that the fiberglass fabric tears in this way such that it loses its protective function.

It has now been found that fire-resistant seating, in particular aircraft seats, which consist of at least a soft, supporting material and a cover, between which there is a fire-resistant intermediate layer, which is a combination of a layer of fiberglass fabric, which is firmly attached to the soft supporting material, and a layer of polyurethane foam, which has been rendered fireresistant and is firmly attached both to the layer of glass fabric and to the cover, does not have the above-mentioned draw-backs and, moreover, can be shampooed, only the cover and the polyurethane foam rendered flame-resistant being wetted and still meeting the cited requirements for air-craft seats both before and after repeated shampooing.

The attachment of the fiberglass fabric layer to the soft supporting material and to the polyurethane foam which has been rendered fire-resistant, and the attachment of the polyurethane foam which has been rendered fire-resistant to the cover, should preferably consist of a hardened fire-retardant glue based on PU or neoprene.

It is imperative that the fiberglass fabric is indeed a fabric and not a non-woven glass mat.

The fiberglass fabric preferably has a weight per unit surface area of 50-300 g/m2.

The minimum thickness of the polyurethane layer which has been rendered fire-resistant is one millimeter; the maximum thickness is not critical. However, it must be possible to fit the cover easily around the combination of the soft, supporting material, the fiberglass fabric and the polyurethane foam rendered fire-resistant. This is possible if the layers of fiberglass fabric and polyurethane foam rendered fire-resistant are, together, not thicker than 15 mm. The polyurethane foam which has been rendered fire-resistant preferably has a density of 30-150 kg/m3.

In principle, any filling material suitable for seating can be used as the soft, supporting material. Preferably, the soft supporting material consists of polyurethane foam with a density of 20-60 kg/m3. The thickness used for blocks of the material of this type is in general 8-12 cm.

A preferred embodiment according to the invention is illustrated in more detail in the appended figure. This figure shows a cross-section of seating according to the invention, 1 representing a block of a polymer foam, such as polyurethane foam. This foam block 1 is firmly attached to a fiberglass fabric layer 2. The fiberglass fabric layer is, in turn, firmly attached to a polyurethane foam 3 which has been rendered fire-resistant. The polyurethane foam which has been rendered fire-resistant is, for example, Firend with a thickness of 5 mm. Firend is a polyurethane foam with an apparent density of 50-120 kg/m3 which has been after-treated with, inter alia, aluminium hydroxide and binders and is marketed by Messrs. Gechem. Fiberglass fabric with a weight per unit surface area of 200 g/m2 is glued to the polyurethane foam block. The seating is provided with upholstery 4, which can consist of 100% wool or of mixture of wool with other materials such as 5% nylon/95% wool. The wool can be rendered flame-resistant, for example by the so-called ZIRPRO process. However, it is also possible to use 100% polyester as the upholstery 4.

EXAMPLE

An aircraft cushion according to the invention is made up of a cushion core surrounded by a fire-resistant intermediate layer and a cover. The components of the intermediate layer are mutually attached by a two-component PU glue. The cover and the intermediate layer, and the cushion core and the intermediate layer are also attached by means of this glue. The foam press process was used for production.

Foam pressure is a process which, by means of glue under the influence of time, temperature and pressure, glues polyurethane foam in a supple fashion to upholstery and all types of textiles, so that a permanent shaped combination (complex) is formed.

Advantages of an aircraft cushion of this type are:

imitation stitching, logos and other styling features can be produced in a single operation by means of foam press;

the cushion has good air permeability, as a result of which good air circulation and removal of body moisture are possible;

the materials used in the complex reinforce one another such that there is less wear on each material during use;

the complex has a stiffness-increasing effect on the total cushion, as a result of which the density of the cushion core can remain relatively low whilst retaining life expectancy;

the cushion can be cleaned with the aid of spray extraction, consequently more rapid and economical cleaning.

The fire-resistant intermediate layer consists of 1. polyurethane foam based on aromatic polyurethane impregnated with fire-retardant agents; thickness: 5 mm; specific gravity 80 kg/m3;

2. a woven fiberglass fabric; type Twill 2/2, with a weight in air of 180 g/m2;

cleaning can take place in the aircraft, rendering removal and transport of upholstery covers for dry-cleaning superfluous. This also results in a considerable saving in time and costs.

Despite the good air permeability of the complex, water injected during spray extraction does not penetrate into the cushion core. As a result, the drying time of the cushion after cleaning is restricted to 40-60 minutes.

N.B. Spray extraction is a cleaning method for carpets and seating with which water +, if desired, liquid cleaning agent, are injected under pressure (1-6 atm) and, at the same time, drawn off again.

With this method water is the medium with the aid of which dirt is removed with portable or transportable machines, for example of the mark Advance.

We claim:

1. Fire-resistant seating, such as aircraft seats, which comprises at least a soft, supporting material and a cover, between which there is a fire-resistant intermediate layer, which is a combination of a layer of polyurethane foam which has been rendered fire-resistant having a thickness between 1 mm to 15 mm, and a fiberglass fabric, characterized in that the fire-resistant intermediate layer is a combination of a layer of fiberglass fabric, which is firmly attached to the soft supporting material, and a layer of polyurethane foam, which has been rendered fire-resistant and is firmly attached both to the layer of fiberglass fabric and to the cover.

2. Seating according to claim 1, characterized in that the fiberglass fabric has a weight per unit surface area of 50-300 g/m2.

3. Seating according to claims 1 or 2, provided with a fire-resistant cover.

* * * * *